United States Patent [19]

Swessel et al.

[11] Patent Number: 4,744,121
[45] Date of Patent: May 17, 1988

[54] LOADING DOCK AND HYDRAULIC SYSTEM THEREFOR

[75] Inventors: Michael A. Swessel; Lynn O. Grunewald, both of Cudahy; Norbert Hahn, So. Milwaukee, all of Wis.

[73] Assignee: Rite-Hite Corporation, Milwaukee, Wis.

[21] Appl. No.: 17,316

[22] Filed: Feb. 20, 1987

[51] Int. Cl.4 .............................................. E01D 1/00
[52] U.S. Cl. ..................................................... 14/71.7
[58] Field of Search ...................... 14/71.1, 71.3, 71.7; 137/113

[56] References Cited

U.S. PATENT DOCUMENTS

| | | | |
|---|---|---|---|
| 315,521 | 4/1885 | Lord et al. | 137/113 |
| 2,371,293 | 3/1945 | Hoof | 137/113 X |
| 2,627,388 | 2/1953 | Johnson et al. | 137/113 |
| 3,008,482 | 11/1961 | Hunter | 137/113 |
| 3,255,478 | 6/1966 | Lambert | 14/71.7 |
| 3,388,413 | 6/1968 | Clarke | 14/71.7 |
| 4,081,874 | 4/1978 | Artzberger | 14/71.7 |
| 4,110,860 | 9/1978 | Neff et al. | 14/71.7 |
| 4,264,259 | 4/1981 | Hipp | 414/401 |
| 4,282,621 | 8/1981 | Anthony et al. | 414/71.1 |
| 4,365,374 | 12/1982 | Bennett | 14/71.7 |
| 4,373,847 | 2/1983 | Hipp et al. | 414/401 |
| 4,379,354 | 4/1983 | Hahn et al. | 14/71.3 |
| 4,472,099 | 9/1984 | Hahn et al. | 414/401 |

FOREIGN PATENT DOCUMENTS

| | | | |
|---|---|---|---|
| 1146309 | 5/1983 | Canada | 14/71.3 |
| 2815535 | 10/1979 | Fed. Rep. of Germany | 14/71.7 |
| 2926057 | 1/1981 | Fed. Rep. of Germany | 14/71.3 |

Primary Examiner—Stephen J. Novosad
Assistant Examiner—John F. Letchford
Attorney, Agent, or Firm—Neuman, Williams, Anderson & Olson

[57] ABSTRACT

A hydraulic system is provided for a loading dock installation wherein the latter has a plurality of independently operable dock levelers arranged in spaced relation along the loading dock. Each leveler includes a hingedly mounted deck member or ramp and a power unit for actuating the deck member to a predetermined upwardly inclined position from a horizontal cross-traffic position. The hydraulic system is provided with a common source of pressurized hydraulic fluid which is remotely disposed relative to the dock levelers. A primary line extends from the common source to each leveler. An adjustable control valve is provided for each leveler and includes a first port which is adapted to communicate with the primary line; a second port which is adapted to communicate with the power unit, and a third port which is adapted to communicate with a drain line. Each control valve is adapted to normally assume a first position of adjustment wherein the second and third ports are interconnected and the first port is blocked. When the control valve is adjusted to a second position of adjustment the first and second ports are interconnected and the third port is blocked thereby causing the deck member to be actuated to the predetermined upwardly inclined position.

4 Claims, 7 Drawing Sheets

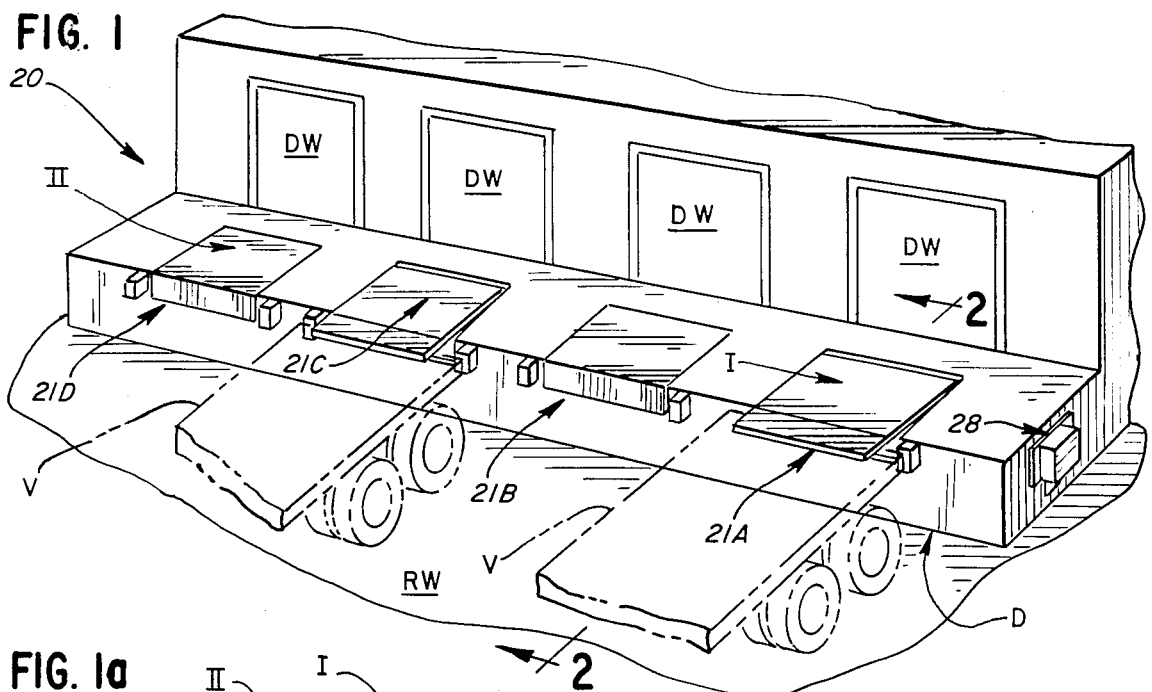
FIG. 1
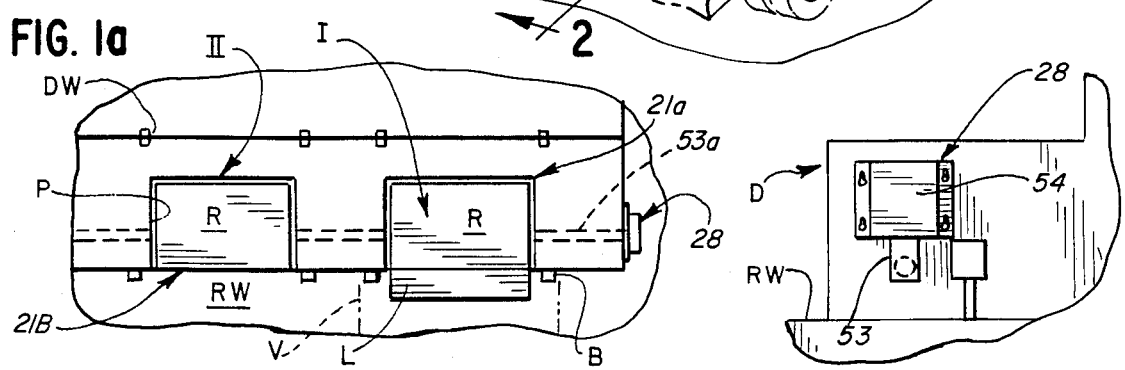
FIG. 1a
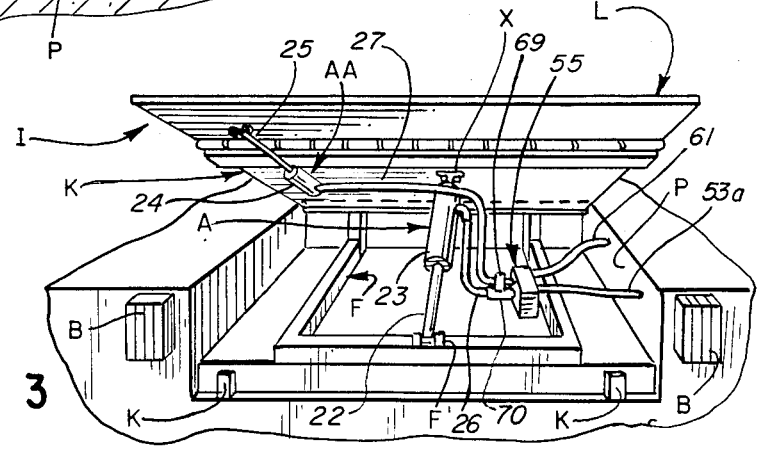
FIG. 1b
FIG. 2
FIG. 3

FIG. 9
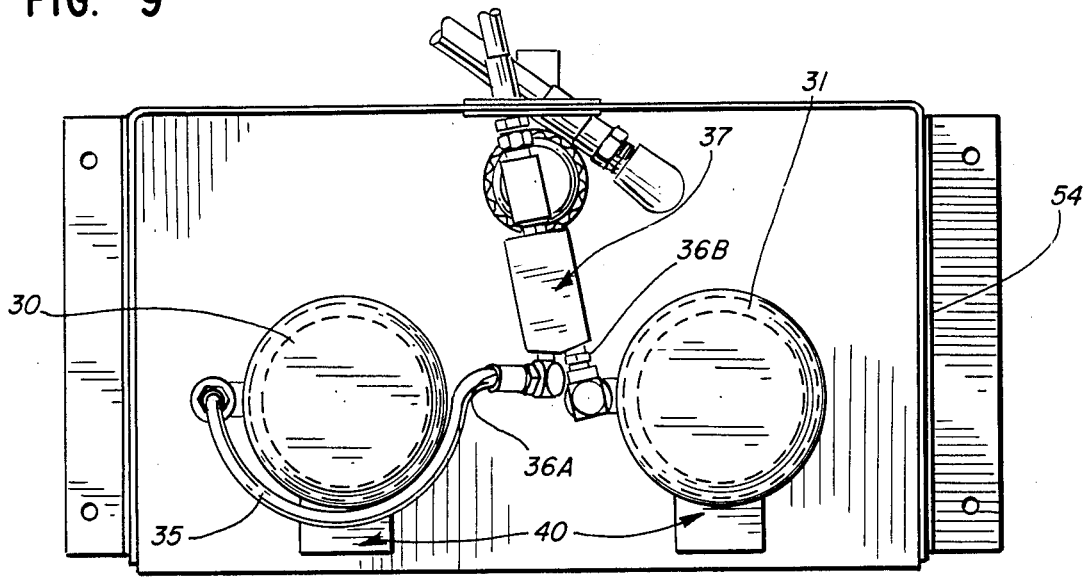
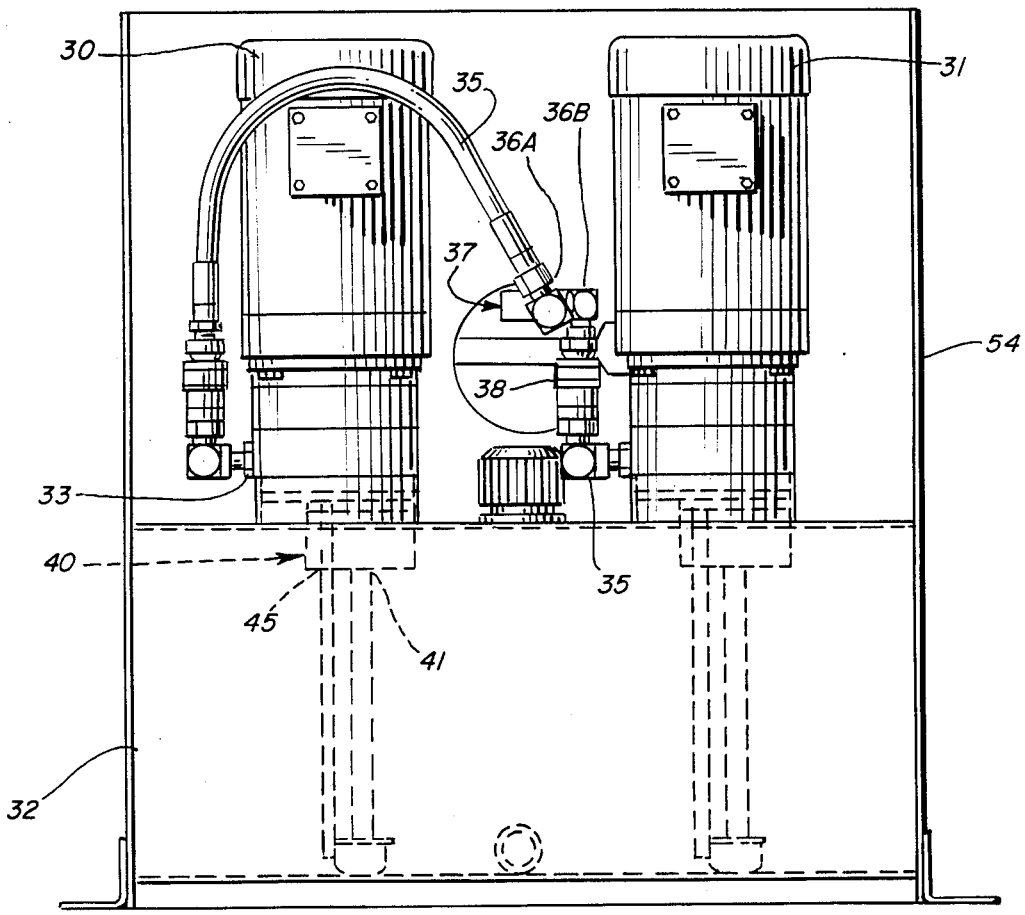
FIG. 8

10

LOADING DOCK AND HYDRAULIC SYSTEM THEREFOR

BACKGROUND OF THE INVENTION

Various hydraulically actuated dock levelers have heretofore been provided wherein each leveler has a self-contained pump, associated fittings and a hydraulic piston-cylinder unit for actuating a hingedly mounted deck member or ramp to a predetermined raised position in order to allow the lip, or extension plate, connected to the outer edge of the deck member to be actuated either hydraulically or mechanically to a desired extended position. Where several dock levelers were utilized in a given loading dock installation, the cost of individual levelers of this type became inordinately high because of the need for each leveler to have its own pump and reservoir. Furthermore, the installation and maintenance of these levelers were more difficult and costly. To overcome this problem where multiple hydraulic dock levelers were utilized in a single loading dock installation, the individual pump for each dock leveler was eliminated and in place thereof a single source of pressurized hydraulic fluid was used which was piped so as to serve all of the levelers involved. Representative of such a installation is that disclosed in Artzberger U.S. Pat. No. 4,081,874. While such installations overcame some of the aforenoted problems they were nevertheless beset with one or more of the following shortcomings: (a) the valving system employed restricted the ability of the dock attendants to simultaneously actuate adjoining dock levelers; (b) the hydraulic system was unable to effectively compensate for sudden changes in hydraulic pressure without causing a shut-down of all or substantially all of the levelers associated with the system; (c) the system failed to provide a backup source of pressurized hydraulic fluid; (d) no means was provided for automatically switching from one source of pressurized hydraulic fluid to a second source where alternative sources were available; (e) the hydraulic system could not be readily installed in existing loading dock installations; and (f) the hydraulic system was not readily capable of being utilized in combination with a secondary hydraulic power unit for actuating the lip, hingedly connected to the deck member, in a predetermined timed sequence with the raising of the deck member to a predetermined upwardly inclined position.

SUMMARY OF THE INVENTION

Thus, it is an object of the invention to provide an improved hydraulic system which is not beset with any of the aforenoted shortcomings.

It is a further object of the invention to provide an improved hydraulic system which incorporates a simple, inexpensive valve for automatically switching between alternate sources of pressurized hydraulic fluid when one source malfunctions.

It is a still further object to provide a loading dock installation having multiple hydraulic dock levelers which utilizes a remote single source of pressurized hydraulic fluid to selectively actuate each leveler deck member and associated lip.

Further and additional objects will appear from the description, accompanying drawings and appended claims.

In accordance with one embodiment of the invention, an improved hydraulic system is provided for use in a loading dock installation having multiple hydraulic dock levelers. Each leveler is provided with a hingedly mounted deck member and a power unit for effecting controlled movement of the deck member to a predetermined upwardly inclined position from a normal horizontal cross-traffic position. The improved system embodies a remote, common source of pressurized hydraulic fluid; a primary line extending from the source to each dock leveler; and an adjustable control valve at each dock leveler. The valve is provided with a first port communicating with the primary line, a second port communicating with the leveler power unit, and a third port communicating with a drain line. The control valve is adapted to normally assume a first position of adjustment wherein the second and third ports are interconnected and the first port is blocked thus, enabling the deck member to assume a cross-traffic position. Each control valve is adapted to be selectively activated to assume a second position of adjustment wherein the first and second ports are interconnected and the third port is blocked. While the control valve is in the second position of adjustment, the deck member of the selected leveler will be actuated to assume a predetermined upwardly inclined position from its cross-traffic position.

DESCRIPTION

For a more complete understanding of the invention reference is made to the drawings wherein;

FIG. 1 fragmentary perspective view of a loading dock installation embodying multiple hydraulic dock levelers.

FIG. 1a is a fragmentary top plan view of the loading dock installation of FIG. 1.

FIG. 1b is a right end elevational view of the loading dock inst of FIG. 1a.

FIG. 2 a enlarged fragmentary sectional view taken along line 2—2 of FIG. 1 and showing a fork-lift truck disposed on an upwardly inclined deck member.

FIG. 3 is an enlarged fragmentary perspective front view of one of the dock levelers of FIG. 1 with the deck member thereof in a fully raised position and the associated lip in an extended position.

Figure 4:
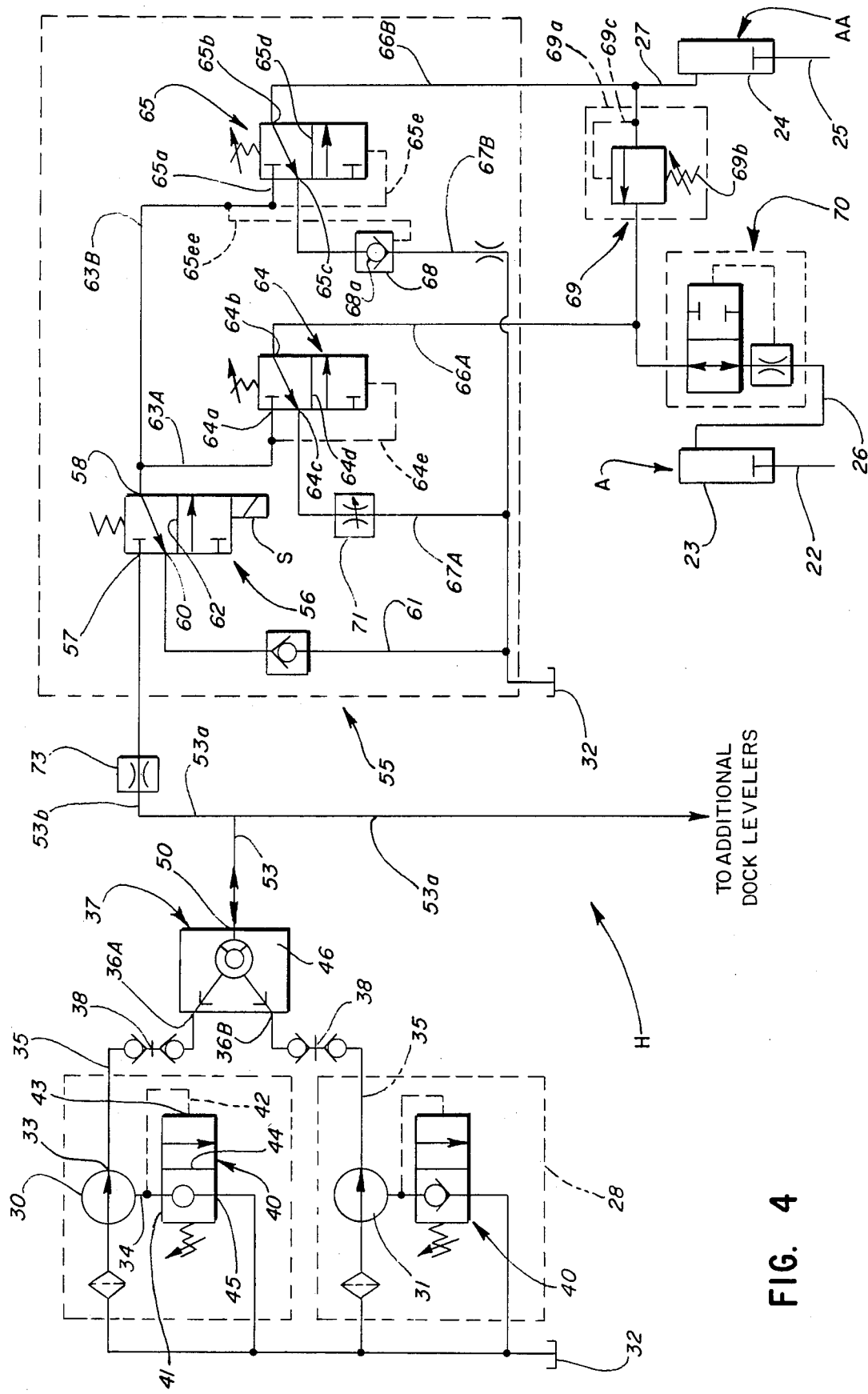

FIG. 4 is a schematic diagram of the improved hydraulic system for the loading dock installation of FIG. 1, but showing only the components for one of the dock levelers embodied in the installation.

Figure 5:
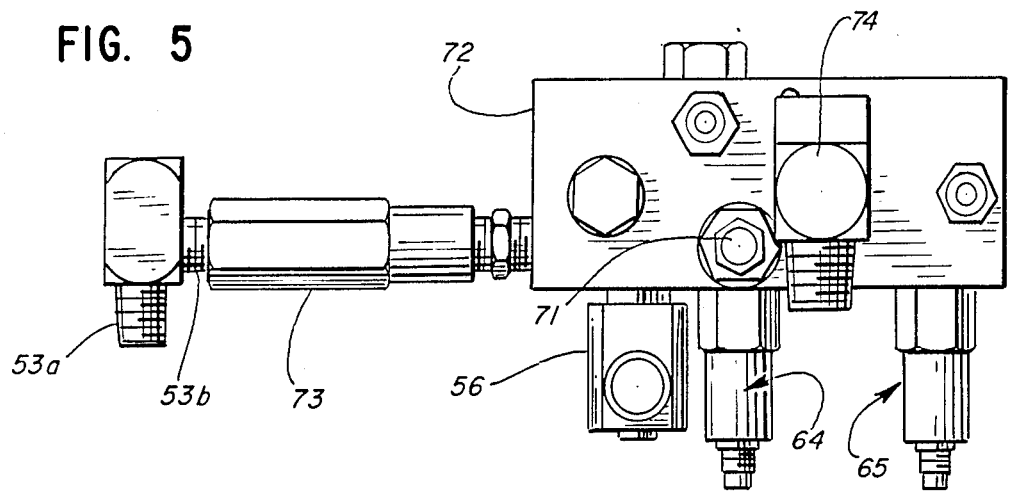
Figure 6:
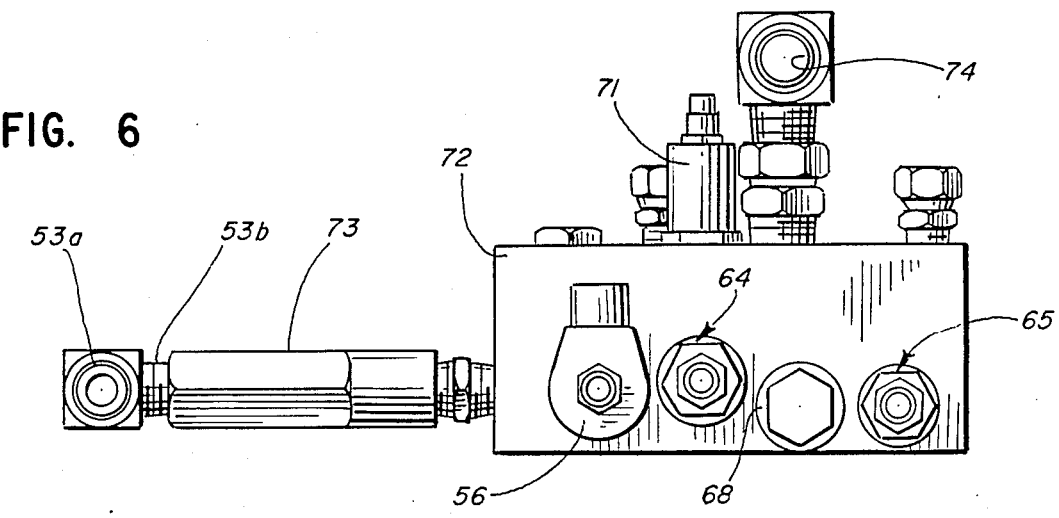
Figure 7:
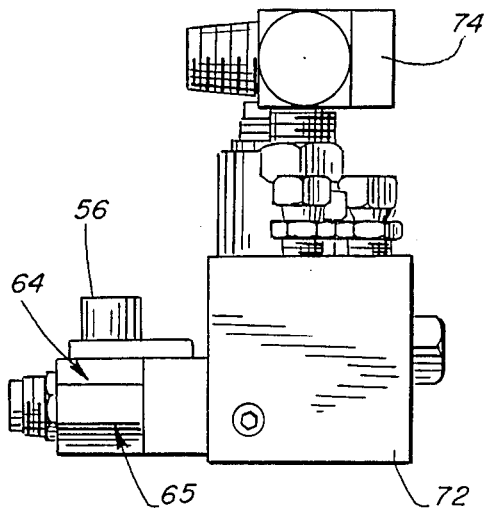

FIGS. 5, 6 and 7 are respectively, front, top and right end elevational views of one form of a valve block assembly shown in FIG. 4 and associated with each dock leveler of FIG. 1.

FIG. 8 is an enlarged front elevational view of one embodiment of the single source of pressurized hydraulic fluid utilized in the installation of FIG. 1 and showing a portion of the housing thereof removed so as to reveal certain of the components disposed within the housing.

FIG. 9 is a top plan view of the source of pressurized hydraulic fluid of FIG. 8 with a portion of the housing thereof removed.

Figure 10:
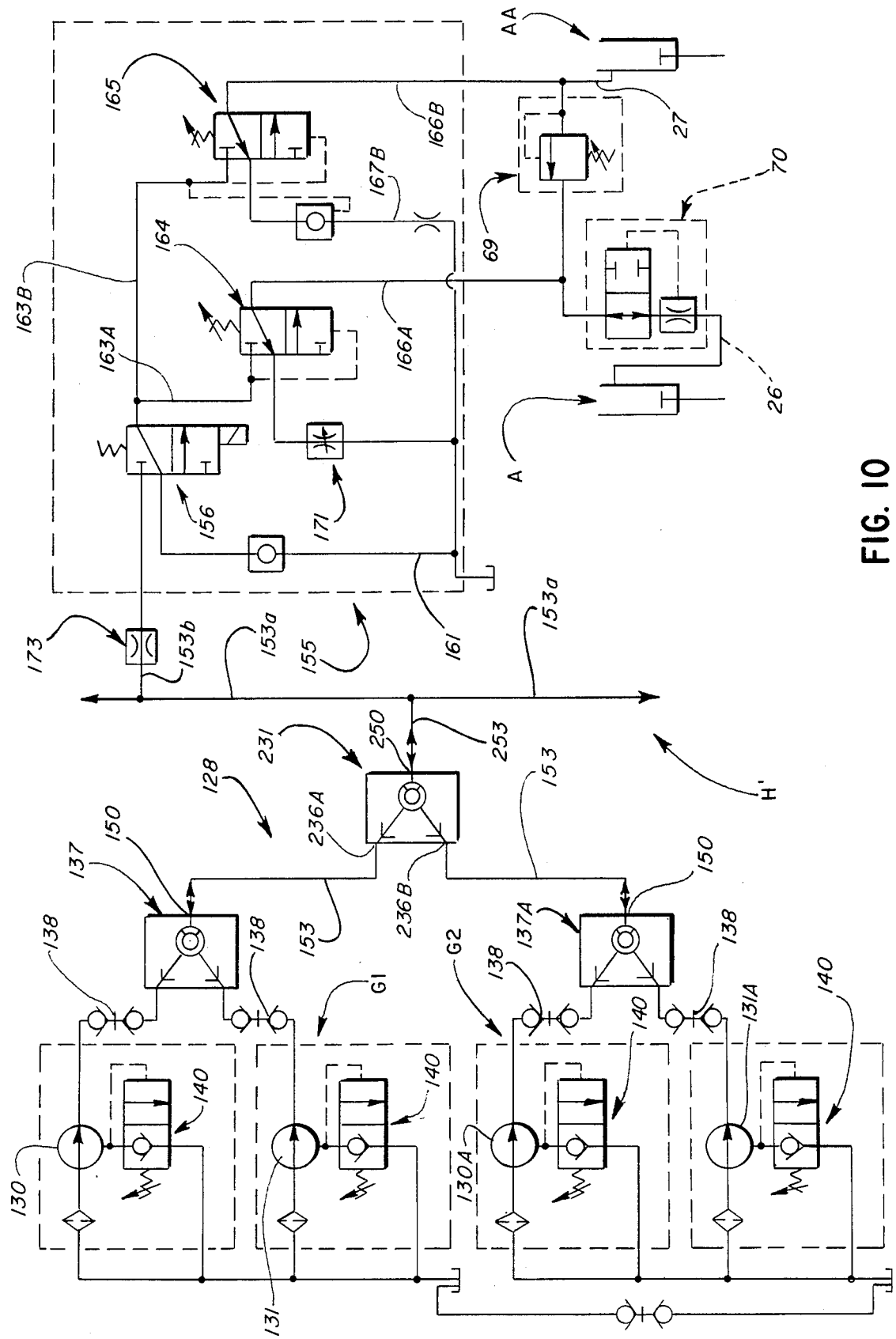

FIG. 10 is a schematic diagram similar to FIG. 4, showing a second embodiment of the improved hydraulic system.

Figure 11:
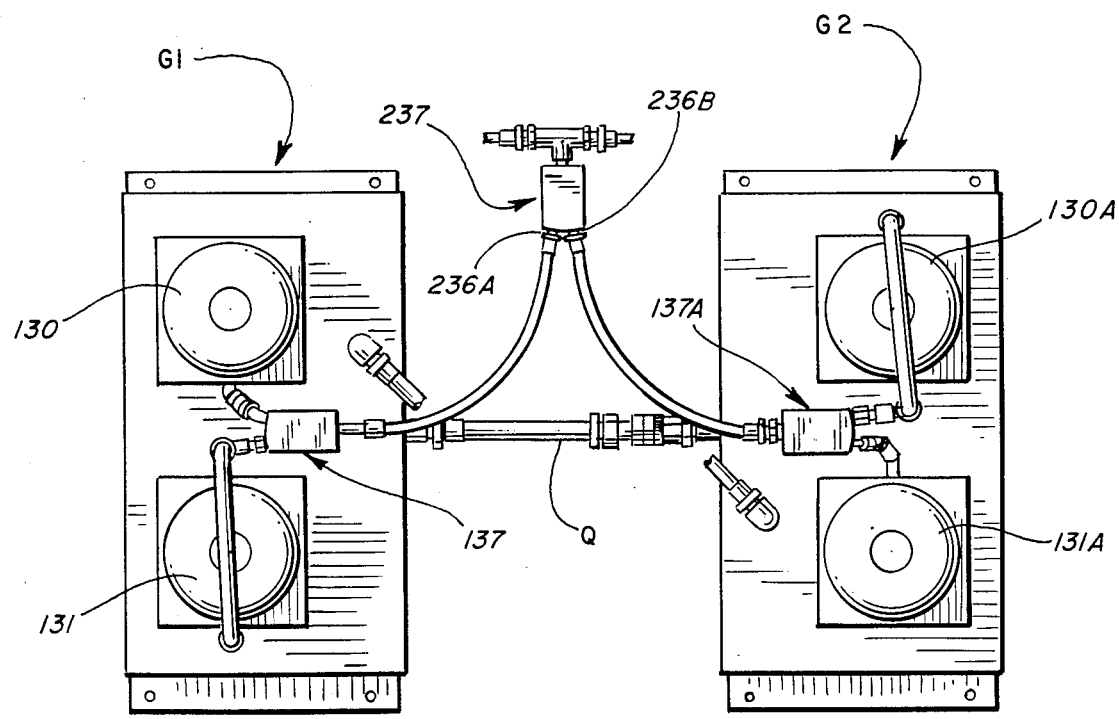

FIG. 11 is a top plan view, similar to FIG. 9, of the source of pressurized hydraulic fluid utilized in the hydraulic system of FIG. 10.

Figure 12:
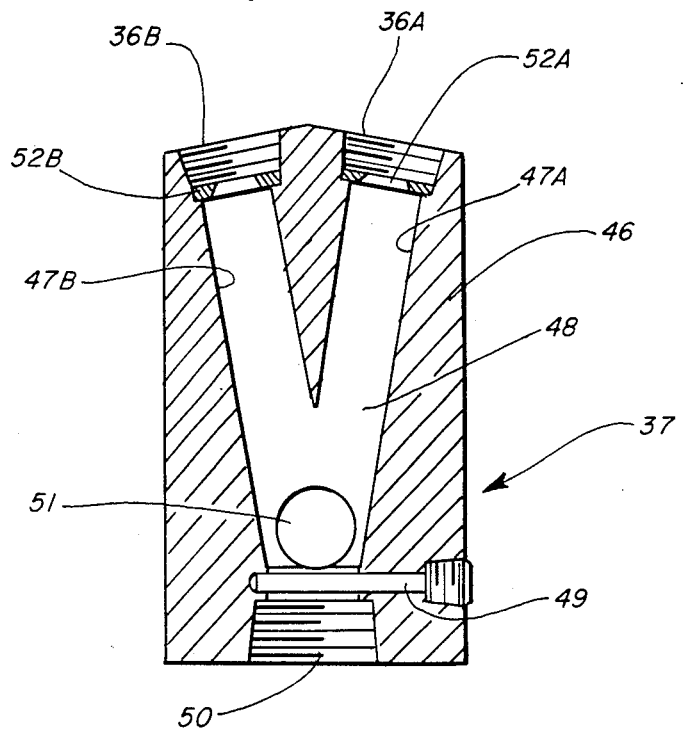
Figure 13:
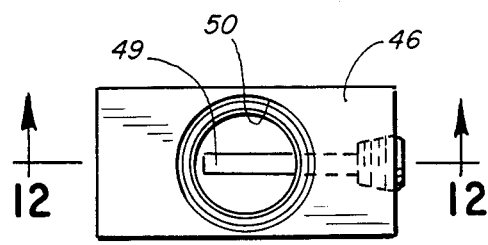

FIG. 12 is an enlarged sectional view of a selector valve incorporated in both of the hydraulic systems disclosed in FIGS. 4 and 10; said view being taken along section line 12—12 of FIG. 13.

Figure 14:
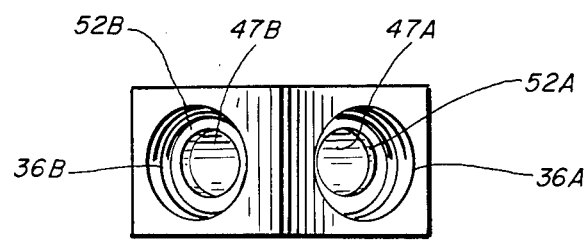

FIGS. 13 and 14 are respectively, bottom and top views of the selector valve of FIG. 12.

Referring now to the drawings and more particularly to FIGS. 1, 1a, and 1b a loading dock installation 20 is shown which incorporates a plurality of hydraulic dock levelers 21A, 21B, 21C and 21D which are arranged in laterally spaced relation along the loading dock D. The number of dock levelers incorporated in the installation 20 may vary over a wide range. Normally, the dock levelers are of like construction and each is located in a pit P formed in the platform, or upper surface, of the dock. The size and configuration of each pit and the manner of installing the framework F of the leveler in the pit are well known in the art and do not form a part of the invention herein disclosed and claimed.

As seen in FIGS. 1 and 3, besides the framework F, each dock leveler includes a hingedly mounted deck member or ramp R; a lip or extension plate L hingedly connected to the front edge of the deck member; a hydraulic piston-cylinder assembly or power unit A for effecting controlled movement of the deck member to a predetermined upwardly inclined position I, see FIG. 3; a second hydraulic piston-cylinder assembly or power unit AA for effecting movement of the lip L to an extended position once the deck member has reached, or is near, its fully upwardly inclined position I; and a control panel CP normally located near the doorway DW serviced by the dock leveler. The control panel for security reasons is normally located within the building associated with the loading dock D. The hydraulic system H, shown in FIG. 4, for the dock levelers will be described in detail hereinafter.

When a dock leveler is not being used, the deck member R thereof normally assumes a cross-traffic position II; that is to say the exposed top surface of the deck member is in coplanar relation with the outside platform surface of the dock over which load handling equipment E travels. Equipment E normally consists of forklift trucks, dollies, etc. The deck member R is supported in its cross-traffic position II, by the lip L assuming a depending position and the lower edge of the lip interlockingly engaging conventional keepers K secured to the front face of the dock adjacent the bottom surface of the pit P, see FIG. 3.

The piston-cylinder assembly A, as seen in FIGS. 2 and 3 has one component 22 thereof (e.g. piston) pivotally connected to a portion F' of the framework F disposed adjacent the open front end of the pit P. A second component 23 of the assembly (e.g. cylinder) is pivotally connected to the underside of the deck member at a location X which is disposed a substantial distance inwardly from the front edge of the deck member.

The second, or auxiliary, piston-cylinder assembly AA has the cylinder 24 thereof fixedly secured to the underside of the deck member R adjacent the hinge Z connecting the lip L to the front edge of the deck member R. The axis of piston 25 of the assembly AA is perpendicular to the axis of hinge Z and the exposed end of the piston 25 is adapted to engage directly or indirectly the concealed surface of the lip L. When the piston 25 is moved to an outwardly projecting position, the lip L will be moved to an extended position and be held in such position by the hydraulic pressure maintained within cylinder 24. Suitable linkage, not shown, may be utilized in place of hydraulic pressure for retaining the lip L in its extended position while the raised deck member and extended lip are lowered from the raised position I until the lip comes to rest upon the bed of the vehicle V parked at the loading dock in front of a selected dock leveler. When piston 25 is in the retracted position, the lip L is free to assume a depending position when the vehicle V moves away from the dock and the deck member R resumes its cross-traffic position II. The vehicle is parked on a roadway RW leading to the loading dock D and is retained at the dock by a suitable vehicle restraint, not shown. Flexible high pressure hoses 26 and 27, respectively, supply hydraulic fluid to assembly A and assembly AA as will be described more fully hereinafter.

Hydraulic system H, as seen in FIG. 4 includes a common source of pressurized hydraulic fluid 28 which is remotely located relative to all of the dock levelers incorporated in the installation 20. Preferably the source 28 is disposed at one end of the loading dock D, see Figs. 1, 1a and 1b where it can be conveniently serviced, when required. It is important that the source be located in a protected area where it will not be accidently struck by a vehicle V when approaching or departing from the dock D, or by the load handling equipment E while maneuvering about the loading dock.

Source 28, as seen in FIG. 4 includes a pair of motor driven pumps 30, 31 which are hydraulically connected in parallel relation. Each pump is of like construction and has an intake side connected to a suitable reservoir 32 of hydraulic fluid, and dual outlets 33, 34. Outlet 33 is connected via line 35 to one of a pair of inlet ports 36A and B formed in a selector valve 37. Line 35 is provided with a quick disconnect coupling 38 which facilitate servicing or replacement of one, or both, of the pumps when required.

The second pump outlet 34 is connected to a relief valve 40 which is biased to normally assume a closed position except when the hydraulic pressure at the valve inlet 41 reaches a predetermined amount (e.g. 700 psi) whereupon the pressure is transmitted via an auxiliary line 42 to a second inlet 43 of the valve, causing the valve piece, or shuttle, 44 thereof to overcome the bias and move to a second position. When the shuttle is in the second position, inlet 41 is in communication with an outlet 45 which in turn is connected to the reservoir 32. Thus, the relief valves 40 prevent either pump being damaged by reason of a malfunction downstream in the system.

As seen in FIGS. 12–14 selector valve 37 is provided with an elongate valve body 46 in which is formed a pair of internal inlet passages 47A and B. A corresponding end of each passage terminates at either inlet port 36A or 36B. The passages 47A and B are angularly disposed and intersect one another within the valve body forming a cavity 48. Communicating with cavity 48 is an outlet port 50. Disposed within cavity 48 is a valve piece 51, which in the illustrated embodiment is an imperforate ball, free to move within the cavity 48 as well as in either passage 47A and B in response to the flow of the hydraulic fluid through the passages from the pumps 30 and 31. Disposed within each passage adjacent the inlet port therefor is an annular valve seat 52A and B. The ball 51 is sized so that it can readily move longitudinally in either passage, but once it engages the valve seat it blocks backflow of hydraulic fluid from the cavity 48 through the respective inlet port. Such a condition automatically occurs if one of the pumps 30 or 31 should malfunction or is shut down while the other pump continues to operate in a normal manner. When, however, both pumps are operating simultaneously the ball 51 will be disposed within cavity 48 and rest upon a removable stop 49 which is recessed from outlet 50. There is sufficient clearance between the periphery of ball 51 and the surface defining cavity 48 to permit the combined normal fluid flow from the passages 47A and B out through outlet 50. Furthermore, the ball 51 can only block one port 36A or 36B at any one time; thus, the unblocked port and associated passage will automatically allow the hydraulic pressure within primary line 53a to be relieved when none of the pumps of source 28 is operating. Thus, by reason of such hydraulic pressure being automatically relieved, a potentially hazardous condition has been avoided when there is servicing of various components of the system located downstream of the selector valve 37. While the valve piece 51 is shown and described as a ball, the invention is not intended to be limited thereto. For example, a hinged flap or gate valve may be substituted therefor. In such modified construction, a flap valve piece may be provided for each passage which normally assumes an open position allowing normal flow to the cavity. If flow in one passage should cease or significantly diminish, then the flap valve piece for that passage will automatically move to a close position assuming flow in the other passage is normal. As seen in FIGS. 8 and 9, the pumps 30, 31; the reservoir 32; the relief valves 40; the quick disconnect couplings 38; and the selector valve 37 are all enclosed within a suitable, protective housing 54. The housing may be bolted to a portion of the roadway RW adjacent the end of the dock or to the end wall of the dock itself.

Connected to the outlet 50 of the selector valve body 46 is a section 53 of a high pressure primary line. The line section 53 is connected to a line section 53a from which a plurality of line sections 53b extend, one line section 53b being provided for each dock leveler included in the loading dock installation. As seen in FIG. 1a, when the loading dock is new construction and before concrete is poured, line section 53a is laid so as to extend beneath the bottom surface of each pit accommodating a dock leveler. The line section 53a terminates at the pit which is furthest removed from the end of the dock on which the housing 54 is mounted. At each pit, line section 53b extends from line section 53a disposed beneath the pit bottom surface to the pit wall. A control valve unit 55 is disposed within the pit and is connected to one end of flexible hose 26. The opposite end of hose 26 is connected to the exterior of cylinder 23 of power unit A.

Where the loading dock is an existing structure the line sections 53, 53a and 53b are exposed and may be mounted on the vertical front wall of the dock and the bottom or side surfaces of each pit. Damage to the exposed line section is avoided by either conventional bumpers B, mounted on the dock front wall on either side of the open end of each pit; or guard rails and posts positioned along the dock and adjacent the front wall thereof. The control valve unit 55 within each pit is preferably mounted on the frame F in the vicinity of cylinder 23 of power unit A. As seen in FIG. 4, each unit 55 includes an adjustable primary two position valve 56 having an inlet first port 57 connected to the primary line section 53b; an outlet second port 58; an outlet third port 60, the latter being connected to a drain line 61; and a movable valve piece or shuttle 62. The shuttle is biased to assume a first position wherein the second and third ports are interconnected and the first port is blocked. When the shuttle 62 is activated, preferably by a solenoid S, to a second position, the first and second ports 57, 58 are interconnected and the third port 60 is blocked. When the shuttle is in the second position, high pressure hydraulic fluid flows from the outlet port 58 through a line section 63A to a ramp sequence valve 64 and through a second line section 63B to a lip sequence valve 65. Both sequence valves 64 and 65 may be of like construction and each comprises an inlet first port 64a, 65a connected, respectively, to line section 63A, 63B; an outlet second port 64b, 65b connected, respectively to line section 66A, 66B, the latter in turn being connected, respectively by flexible hoses 26 and 27 to the cylinders of power unit A or AA; an outlet third port 64c, 65c; connected respectively, to drain line 67A, 67B; and an adjustable valve piece, or shuttle, 64d, 65d. The shuttles in both sequence valves 64 and 65 are adapted to assume a first position wherein the second and third ports are interconnected and the first port is blocked. Each shuttle 64d, 65d will automatically move to a second position; but, shuttle 64d will move before shuttle 65d in accordance with a predetermined sequence, as will be described hereinafter. When the shuttle is in the second position the first and second ports are interconnected and the third port is blocked. In order to effect movement of shuttle 64d to the second position requires a hydraulic pressure (e.g. 200 psi) which is significantly less than the pressure (e.g. 590 psi) required to move shuttle 65d to the second position. Both sequence valves are provided with an auxiliary line section 64e and 65e, one end of which is connected to the respective line section 63A and 63B and the opposite end is connected to an end of a cavity within each sequence valve wherein the entering hydraulic fluid will cause the respective shuttle 64d, 65d to move within the cavity and overcome the bias exerted thereon to remain in the aforedescribed first position. The amount of hydraulic pressure required to effect movement of the shuttle can be varied by adjusting the bias spring pressure through adjusting a threaded cap or plug, not shown, engaging an end of the spring which is opposite the end engaging the shuttle in question. As seen in FIG. 4, line section 63B is provided with a second auxiliary line 65ee which has one end thereof connected upstream of valve 65 and the opposite end connected to the downstream side of a ball type check valve 68 which is disposed within drain line 67B. Thus, check valve 68 will not allow flow through drain line 67B from sequence valve 65 until an unseating pressure is exerted on the ball 68a thereof.

When shuttle 64d is in the second position and high pressure hydraulic fluid is introduced into line section 66A, the fluid passes through a conventional velocity fuse 70 and hose 26 before entering the end of cylinder 23 of power unit A causing the latter to move the ramp R to its upwardly inclined position I. Pressure within cylinder 23 is sufficient to retain the ramp in position I, while the pressure within line section 63B builds up to a point where shuttle 65d will automatically shift to the second position and pressurized fluid will enter the cylinder of power unit AA through hose 27 causing the piston 25 thereof to be moved to an extended position and effect pivoting of the lip L to its extended position.

The valve piece or shuttle 62 of primary valve 56 will remain in its second position only as long as an "up" control button, not shown, provided on the control panel CP is continuously depressed manually by a dock attendant.

Once ramp R and extended lip L are in position I, the dock attendant releases the "up" button on the control panel CP, whereupon the solenoid S of control valve 56 is de-energized allowing shuttle 62 of the valve to automatically return to its normal first position shown in FIG. 4 wherein port 58 is connected to the drain port 60. Once pressure within line sections 63A, 63B is dissipated, the shuttles 64d and 65d of sequence valves 64 and 65, respectively, will automatically return to their normal positions shown in FIG. 4 whereby the ramp cylinder 23 will drain. Draining of the hydraulic fluid from cylinder 24 of the lip power unit AA through sequence valve 65 cannot occur, however, because check valve 68 closed as soon as pressure within auxiliary line section 65ee decreased due to the line section 63B being connected by shuttle 62 to drain port 60 of the control valve 56. Because of this condition, drainage of hydraulic fluid from power unit AA occurs only through an adjustable lip check valve 69, see FIG. 4. One side of valve 69 is connected to hose 27 leading to the cylinder 24 of power unit AA, and the other side is connected to the line section 66A leading to the velocity fuse 70. A shuttle 69a of lip check valve 69 is biased by an adjustable spring 69b to normally assume a position wherein there is no flow through the valve 69. An auxiliary line section 69C is provided which has one end thereof communicating with line section 66B and the other end connected to an end of a shuttle cavity within valve 69 which is opposite the shuttle bias spring 69b. Thus, the shifting of the shuttle 69a to a second position allowing flow through the valve 69 will occur when the pressure within line section 69c overcomes the bias of adjustable spring 69b. The time interval required to shift shuttle 69a and effect draining of cylinder 24 is sufficiently long relative to draining of ramp cylinder 23 so that the lip will remain extended so as to engage the surface of the bed of the parked vehicle V as the drainage of cylinder 23 allows deck member R to pivot downwardly from its upwardly inclined position I.

Where a mechanical linkage, not shown is utilized instead of the hydraulic pressure of power unit AA to retain the lip L in its extended position, such a linkage is tripped when the extended lip comes to rest upon the bed of the parked vehicle V. Thus, when utilizing either the linkage or only the hydraulic pressure within power unit AA to retain the lip in its extended position until the latter engages the vehicle bed, the lip will automatically pivot to a depending position as soon as the vehicle moves away from the dock and the lip becomes disengaged from the vehicle bed. The rate at which the ramp pivots downwardly is regulated by an adjustable flow control 71 disposed in the drain line 67A for the ramp sequence valve 64.

Referring to FIGS. 5-7 it will be noted that primary valve 56, ramp sequence valve 64, lip sequence valve 65, flow control valve 71 and check valve 68 are all mounted on or within a compact valve block 72 which may be mounted on the exterior of cylinder 23 of power unit A or in close proximity thereto. As seen in FIGS. 5 and 6, the primary line section 53b and a fixed flow control valve 73 associated therewith are connected to the left end face of block 72. Valve 73 limits the maximum flow of the pressurized hydraulic fluid entering the dock leveler to a predetermined amount (e.g. 3 GPM). Projecting from the upper surface of block 72 is a connector 74 which is adapted to connect with drain line sections 61, 67A and B.

Referring to FIG. 10, a modified improved hydraulic System H' is shown which differs from system H, FIG. 4 only with regard to the source 128 of pressurized hydraulic fluid. In place of the two pumps 30, 31 of source 28, source 128 utilizes four pumps 130, 130A, 131 and 131A with pumps 130, 131 comprising one group G1 and pumps 130A, 131A comprising a second group G2. The pumps in each group are hydraulically connected in parallel relation in the same manner as previously described with respect to FIG. 4. In addition the groups G1 and G2 are, in turn, hydraulically connected to one another in parallel, as will be described more fully hereinafter.

For purposes of facilitating understanding of system H', the components thereof corresponding to those shown in FIG. 4 will be identified by the same number but in a one hundred series. The arrangement of the components in each group G1 and G2 comprising source 128 is the same as the component arrangement in source 28. Thus, the only basic differences between sources 28 and 128 are (a) that in the latter the outlet port 150 of each selector valve 137 is connected to a corresponding inlet port 236A, 236B of a third selector valve 237, and (b) the pumps in group G1 are intended to serve a predetermined number of dock levelers and the pumps in group G2 are intended to serve the remaining dock levelers of a given loading dock installation. The capacities of the pumps comprising either group G1 or G2 are such that if one group of pumps should malfunction and be shut down, the other group of pumps would be capable of servicing all of the dock levelers in the loading dock installation.

Third selector valve 237 is preferably of the same construction as valve 37 previously described and shown in FIGS. 12-14. The maximum number of dock levelers normally served by one group of pumps G1 or G2 is approximately twenty (20). The number will depend upon the size and capacity of each pump in a group.

As aforementioned with either hydraulic system H or H', each dock leveler is operable independently of the others regardless of the relative locations of the other levelers in the dock installation. This capability is an advantage over prior systems because it gives the loading dock supervisor greater flexibility in spotting the incoming vehicles along the dock. The wiring between the control panel CP and the solenoid actuated control valve 56 of the corresponding dock leveler is simple, inexpensive to install and can operate on 110 V. Each control panel is wired to the pump motors comprising the source of pressurized hydraulic fluid so that the motors will operate only when the "up" push button is depressed. If the "up" push button of another control panel has been previously depressed and the pump motors are already operating, the depressing of the second "up" push button will have no effect. It is only when none of the pump motors is operating that pushing the "up" button of one control panel CP will initiate operation of the pump motors serving the dock leveler in question.

In hydraulic system H', the reservoir portions of pump groups G1, G2 are hydraulically interconnected by a hose section Q, see FIG. 11, whereby if one group of pump motors is overloaded or is inoperative, due to a malfunction, the other group pump motors will be automatically actuated and supply the necessary pressurized hydraulic fluid to any selected dock leveler in the installation.

Thus, an improved hydraulic system has been provided which utilizes a single source of pressurized hydraulic fluid without sacrificing the ability of selectively operating independently or simultaneously one or more dock levelers. The improved hydraulic system utilizes one or more selector valves which automatically switch from one pump or a group of pumps to another pump or group of pumps in the event there is a malfunction of the one pump or group of pumps. The improved hydraulic system is easy to install, efficient to operate, may be utilized in new or existing loading dock installations, and may be utilized for actuating the deck member and associated extension plate in a predetermined time sequence.

We claim:

1. In a loading dock installation having a plurality of separate relatively spaced dock levelers operable independently of one another, each leveler including a hingedly mounted ramp, an extension member hingedly mounted on a peripheral segment of the ramp adjacent a front wall of the loading dock for movement between an extended position and a normally depending position, and hydraulically actuated power means associated with each ramp and the extension member connected thereto for effecting selective movement of the ramp from a substantially horizontal cross-traffic position wherein the extension member is in the normal depending position to a predetermined upwardly inclined position whereupon the extension member is hydraulically actuated to the extended position; the improvement comprising a hydraulic system having a common source of pressurized hydraulic fluid in communication with all of said dock levelers and remotely located relative thereto; a primary high pressure hydraulic line means extending from said source to each leveler; and an independently adjustable control valve means for each leveler interposed said primary high pressure hydraulic line means and the power means for said leveler and associated extension member, said valve means including a primary valve having a first port communicating with said primary high pressure hydraulic line means, a second port communicating with a ramp sequence valve, the latter being adapted to communicate with the ramp power means of a selected leveler, and a third port adapted to communicate with a drain line, said control valve means normally assuming a first position of adjustment wherein said second and third ports are interconnected and said first port is blocked, each control valve means being adapted to be selectively moved independently to a second position of adjustment wherein said first and second ports are interconnected and said third port is blocked whereby the power means of the selected leveler is actuated effecting independent movement of the ramp thereof to the predetermined upwardly inclined position and movement of the extension member to an extended position when the ramp assumed a predetermined upwardly inclined position.

2. The hydraulic system of claim 1 wherein the common source of pressurized hydralic fluid includes at least a pair of pump means hydraulically interconnected in parallel relation, and selector valve means; said selector valve means having a housing provided with a pair of inlet ports, each inlet port being in communication with a discharge side of a pump means, and a single outlet port communicating via the primary line means with the control valve means for each leveler; and a movable valve element disposed within said housing and, when said pump means of the pair are simultaneously operating, effecting communioation between said outlet port and each inlet port; when one pump means of the pair is inoperative, said valve element automatically interrupting communication between said outlet port and the inlet port for said inoperative pump means while communication is maintained between the outlet port and the inlet port for the oeprative pump means, each pump means of the pair having sufficient pump capacity to operate simultaneously or independently all dock levelers in communication with the housing outlet.

3. The hydraulic system of claim 1 wherein the primary line means is prvided with means for automatically limiting the maximum rate of flow of the hydraulic fluid from the primary line means to a selected control valve means when the latter is in the second position of adjustment.

4. The loading dock installation of claim 1 wherein each leveler is prvided with a ramp power means for actuating the ramp thereof to the upwardly inclined position and an extension member power means for actuating the extension member associated with said ramp from the depending position to the extended position; said hydraulic system including an extension member sequence valve having an inlet port communicating with the second port of the primary valve of the control valve means, a first outlet port communicating with an inlet port of the extension member power means, and a second outlet port communicating with a drain line, said extension member sequence valve being biased to normally assume a first position of adjustment whereby the first and second outlet ports thereof are in communication with one another and the inlet port is blocked, said extension member sequence valve being provided with a pressure responsive means for overcoming the bias of the extension member sequence valve and effecting movement thereof from the first position of adjustment to a second position of adjustment whereby the inlet port and the first outlet port are in communication and the second outlet port is blocked, the pressure effecting response of the extension member power means being sensed at the inlet port of said extension member sequence valve; the hydraulic pressure effecting adjustment of the ramp sequence valve being less than the hydraulic pressure required to effect adjustment of the extension member sequence valve from the first position to the second position of adjustment.

* * * * *

UNITED STATES PATENT AND TRADEMARK OFFICE
CERTIFICATE OF CORRECTION

PATENT NO. : 4,744,121
DATED : May 17, 1988
INVENTOR(S) : Michael A. Swessel, et al.

It is certified that error appears in the above-identified patent and that said Letters Patent is hereby corrected as shown below:

```
Col. 1, line 26, "a" should be --an--

Col. 2, line 31 before "fragmentary" insert "is a"

Col. 2, line 37, "inst" should be --installation--

Col. 2, line 38,   "a" to read -- is a --.

Col. 10, line 1, "assumed" should be --assumes--

Col. 10, line 14, correct spelling of --communication--

Col. 10, line 20, correct spelling of --operative--

Col. 10, line 26, correct spelling of --provided--

Col. 10, line 32, correct spelling of --provided--
```

Signed and Sealed this

Thirty-first Day of January, 1989

*Attest:*

DONALD J. QUIGG

*Attesting Officer*  *Commissioner of Patents and Trademarks*